Patented July 10, 1945

2,380,228

UNITED STATES PATENT OFFICE 2,380,228

HYDROCARBON TREATMENT

Stewart C. Fulton, Elizabeth, and Thomas Cross, Jr., Union, N. J., assignors to Standard Oil Development Company, a corporation of Delaware No Drawing. Application March 5, 1942, Serial No. 433,484

2 Claims. (Cl. 196—50)

The present application is a continuation-in-part of our copending application, Serial No. 296,919, filed September 28, 1939, now U. S. Patent 2,363,858 which in turn is a continuation-in-part of our Serial No. 55,234, filed December 19, 1935, now Patent No. 2,204,673.

The present invention relates to novel methods of converting hydrocarbons into desired products, and more particularly relates to improved methods for reforming gasoline and naphthas in the presence of a catalyst comprising aluminum chloride supported on a material such as Activated Alumina or silica gel.

As is generally known, a tremendous amount of research has been directed in the last few years toward the production of high octane number gasoline. This research has resulted in the development of processes such as the alkylation of isoparaffins with olefins to produce branched chain hydrocarbons boiling within the gasoline range, which products have very high anti-detonation qualities. Other methods of improving the octane rating of gasolines and naphthas involve reforming the gasoline or naphthas usually in the presence of a catalyst and added hydrogen.

The present invention is directed toward improving the quality of naphthas and gasoline by a reforming operation carried out in the presence of a catalyst comprising aluminum chloride supported on silica gel or Activated Alumina, the catalyst having the property of being stable at temperatures above the volatilization temperature of aluminum chloride against the loss of the said aluminum chloride.

In order to afford a better understanding of our invention, the following specific examples setting forth preferred embodiments of our invention are given below:

Example 1

An East Texas heavy naphtha (B. P. about 250°–400° F.) was contacted at a temperature of about 420° F. and a feed rate of about 0.5 cc. per gram of catalyst per hour with a catalyst comprising about 8% substantially anhydrous AlCl$_3$ on silica gel. The catalyst may be prepared by forming a silica gel by well known methods, drying the gel, which may be in the form of pills, extruded lengths, granules or the like, and thereafter impregnating the gel with a solution or slurry of aluminum chloride in ethylene dichloride. The ethylene dichloride and any excess AlCl$_3$ not absorbed is removed by heating the catalyst preferably in a stream of inert gas such as N$_2$. The liquid product resulting from this reforming operation showed an octane number improvement of 9.0 (C. F. R.). Upon analysis it was shown that 2.9% by weight of gas was formed, which gas consisted mainly of isobutane. This example tends to show, among other things, that the reforming of naphtha catalytically involves the isomerization of hydrocarbons.

Example 2

Another run was carried out on reforming East Texas heavy naphtha in the same way as Example 1 but at a temperature of about 620° F. and a feed rate of 0.9 cc. per gram of catalyst. The gas formation increased to 4.0% and contained substantial amounts of constituents lighter than isobutane in contrast to the gas formed at the lower temperature. The octane in the preceding improvement was again 9 C. F. R. units.

Example 3

A light East Texas naphtha having a final or an end point of about 250° F. is reformed over a catalyst comprising substantially anhydrous AlCl$_3$ supported on silica gel. Using conditions similar to Example 1 results in an octane number improvement of about the same order. As in the case of the lower temperature operation, the gas formed is substantially isobutane.

Instead of impregnating the carrier with a slurry or solution of aluminum chloride in a halogenated hydrocarbon or other non-aqueous solvent, we may treat the silica gel or the alumina with vaporized aluminum chloride. Preferably, this is accomplished by heating the aluminum chloride to vaporize the same, then mixing it with a carrier gas such as N$_2$, CO$_2$, flue gas, etc., and forcing the mixture through a heated mass of silica gel or alumina. The aluminum chloride is adsorbed by the silica gel or alumina in a state where it is stable against volatilization above the vapor point of the said aluminum chloride. Upon saturation of the silica gel or alumina with aluminum chloride in the manner indicated, the carrier is treated with an inert gas such as N$_2$, CO$_2$, etc., to remove unbound or removable aluminum chloride. This method of impregnation is described in detail in the application of J. H. Bartlett, Serial No. 415,235, filed October 14, 1941.

Our invention refers to improved methods of reforming naphthas and the gist of the invention is in the new catalyst employed for this purpose. We may according to our process reform either light or heavy naphtha or a whole gasoline fraction according to the methods hereinbefore set forth, i. e., the anhydrous impregnation of the silica gel or the alumina with the aluminum chloride and also in the absence of substances which will react with the aluminum chloride chemically, such as alcohols, ethers, etc.

In reforming naphthas or gasoline, the temperature employed may be from about 350° F. to 950° F. or higher, the feed rates of oil to the reaction zone may vary from 0.1 to 10 volumes of oil per volume of catalyst per hour on a cold oil basis, and the pressure may be from below atmospheric to 200 to 300 lbs. per square inch gauge. Hydrogen may be mixed with the feed stock in the amount of from 20 to 80 mol per cent hydrogen of the hydrocarbon feed stock.

Many modifications of our invention not specifically mentioned herein will readily suggest themselves to those familiar with the present art.

We claim:

1. The process of reforming naphtha which comprises contacting said naphtha at reforming temperatures with a catalyst prepared by impregnating an activated solid adsorbent with aluminum chloride vapors contained in a carrier gas and then heating the mass with an inert gas to remove unadsorbed aluminum chloride.

2. A process according to claim 1 in which the activated solid adsorbent is activated silica gel.

STEWART C. FULTON.
THOMAS CROSS, Jr.